United States Patent
Suh et al.

(10) Patent No.: US 9,444,511 B2
(45) Date of Patent: *Sep. 13, 2016

(54) PLUG-AND-PLAY TIME-VARIANT ANTENNA MODULE FOR WIRELESS COMMUNICATION DEVICES

(71) Applicants: Intel Corporation, Santa Clara, CA (US); Virginia Tech Intellectual Properties, Inc., Blacksburg, VA (US)

(72) Inventors: Seong-Youp Suh, Portland, OR (US); Harry G. Skinner, Beaverton, OR (US); W. Dawson Kesling, Davis, CA (US); Majid Manteghi, Blacksburg, VA (US)

(73) Assignees: INTEL CORPORATION, Santa Clara, CA (US); VIRGINIA TECH INTELLECTUAL PROPERTIES, INC., Blacksburg, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/629,244

(22) Filed: Feb. 23, 2015

(65) Prior Publication Data

US 2015/0171915 A1 Jun. 18, 2015

Related U.S. Application Data

(63) Continuation of application No. 13/603,749, filed on Sep. 5, 2012, now abandoned.

(51) Int. Cl.
*H04B 1/18* (2006.01)
*H04B 1/40* (2015.01)
(Continued)

(52) U.S. Cl.
CPC ............... *H04B 1/40* (2013.01); *H04B 1/006* (2013.01); *H04B 1/0458* (2013.01); *H04B 1/18* (2013.01); *H04B 1/401* (2013.01); *H04B 1/406* (2013.01); *H04B 17/12* (2015.01); *H04B 17/21* (2015.01)

(58) Field of Classification Search
CPC .................................................. H04B 1/0458
USPC .................... 455/193.1–193.3; 333/32, 124; 343/860, 861
See application file for complete search history.

(56) References Cited

U.S. PATENT DOCUMENTS

| 6,064,868 A | 5/2000 | Kobayashi |
| 2004/0009754 A1 | 1/2004 | Smith |

(Continued)

FOREIGN PATENT DOCUMENTS

| CN | 1669218 A | 9/2005 |
| CN | 1770642 A | 5/2006 |
| WO | 2013089790 A1 | 6/2013 |

OTHER PUBLICATIONS

Manteghi, "A Switch-Band Antenna for Software-Defined Radio Applications", IEEE Antennas and Wireless Propagation Letters, vol. 8, 2009, pp. 3-5.

(Continued)

*Primary Examiner* — Lee Nguyen
(74) *Attorney, Agent, or Firm* — Stoel Rives LLP; Robert R. Teel

(57) ABSTRACT

A plug-and-play antenna may be used with many different types of wireless communication devices. An antenna may be coupled to an impedance tuning component and a waveform generator. A calibration control module receives radio status information, controls the waveform generator to vary a response of the antenna, and tunes the impedance tuning component to match impedances between a radio and the antenna.

29 Claims, 5 Drawing Sheets

(51) Int. Cl.
*H04B 1/00* (2006.01)
*H04B 1/04* (2006.01)
*H04B 1/401* (2015.01)
*H04B 1/403* (2015.01)
*H04B 17/12* (2015.01)
*H04B 17/21* (2015.01)
*H04B 1/26* (2006.01)

(56) References Cited

U.S. PATENT DOCUMENTS

| | | |
|---|---|---|
| 2005/0184922 A1 | 8/2005 | Ida et al. |
| 2006/0094458 A1 | 5/2006 | Kitaji |
| 2007/0035356 A1 | 2/2007 | Ranta |
| 2011/0166629 A1* | 7/2011 | Dion .................. A61N 1/08 607/60 |
| 2011/0256841 A1* | 10/2011 | Kakuya .................. H04B 1/18 455/334 |
| 2012/0088463 A1 | 4/2012 | Rofougaran |
| 2014/0018020 A1* | 1/2014 | Suh .................. H01Q 9/145 455/107 |

OTHER PUBLICATIONS

Manteghi, "Antenna Miniaturization Beyond the Fundamental Limits Using Impedance Modulation", IEEE Antennas and Propagation Society International Symposium, 2009, 4 pages.

Manteghi, "Non-LTI Systems, a New Frontier in Electromagnetics Theory", IEEE Antennas and Propagation Society International Symposium (APSURSI), 2010, 4 pages.

PCT/US2013/046535, International Search Report and Written Opinion, Sep. 4, 2013, 15 pages.

Peregrine Semiconductor Corp., "Peregrine Semiconductor Unveils Digitally Tunable Capacitors Variable Capacitors Enable Frequency-agile Tunable Networks", Jun. 8, 2011, 3 pages.

Peregrine Semiconductor Corp "Product Specification PE64904 Ultra CMOS® Digitally Tunable Capacitor (DTC) 100—3000 MHz", 2011, pp. 1-11.

* cited by examiner

PLUG-AND-PLAY TIME-VARIANT ANTENNA MODULE FOR WIRELESS COMMUNICATION DEVICES

RELATED APPLICATION

This application claims priority benefit of U.S. patent application Ser. No. 13/603,749, filed Sep. 5, 2012, which is hereby incorporated by reference herein in its entirety.

TECHNICAL FIELD

Embodiments of the present disclosure generally relate to the field of wireless communication devices, and more particularly, to plug-and-play, time-variant antenna modules for wireless communication devices.

BACKGROUND INFORMATION

Specified antenna performance characteristics are difficult to maintain after antennas are installed in different mobile devices. Even among mobile devices with identical or similar form factors, slightly different antenna-installation locations that may be attributable to manufacturing tolerances or errors typically result in deviations between the specified and the actual antenna performance. These deviations can negatively affect antenna performance and efficiency. For example, an antenna installed at a location offset by some distance (e.g., one or two millimeters) from its specified location may cause the antenna to deviate from its specified resonate frequency, which may result in a power amplifier wasting power while tuning the antenna to its originally specified resonant frequency. This inefficiency prematurely drains a battery of the mobile device, or results in suboptimal transmission and reception.

To address potential performance concerns, conventional antennas are specifically designed for various form factors. However, specifically designed antennas increase development costs and time-to-market for mobile devices. Moreover, once the antenna is installed, its efficiency cannot be readily improved because the conventional antenna is specifically designed and fully integrated with the transceiver in the mobile device. Furthermore, even for specifically designed antennas, unpredictable manufacturing errors, interference from the human body, or other environmental conditions may degrade performance. For example, a user's hand or head touching the mobile device will typically detune the antenna to a degree that is often unpredictable, as it depends on a user's physical characteristics, the way mobile devices are held, or other environmental factors. Performance degradation of multi-band or broadband antennas is difficult to dynamically improve because the environmental factors affecting the antenna may simultaneously detune multiple (or broad) frequency bands employed by the antenna.

BRIEF DESCRIPTION OF THE DRAWINGS

Aspects of embodiments will be apparent from the following detailed description of embodiments, which proceeds with reference to the accompanying drawings. Embodiments are illustrated by way of example and not by way of limitation in the figures of the accompanying drawings.

DESCRIPTION OF THE EMBODIMENTS

Figure 1:
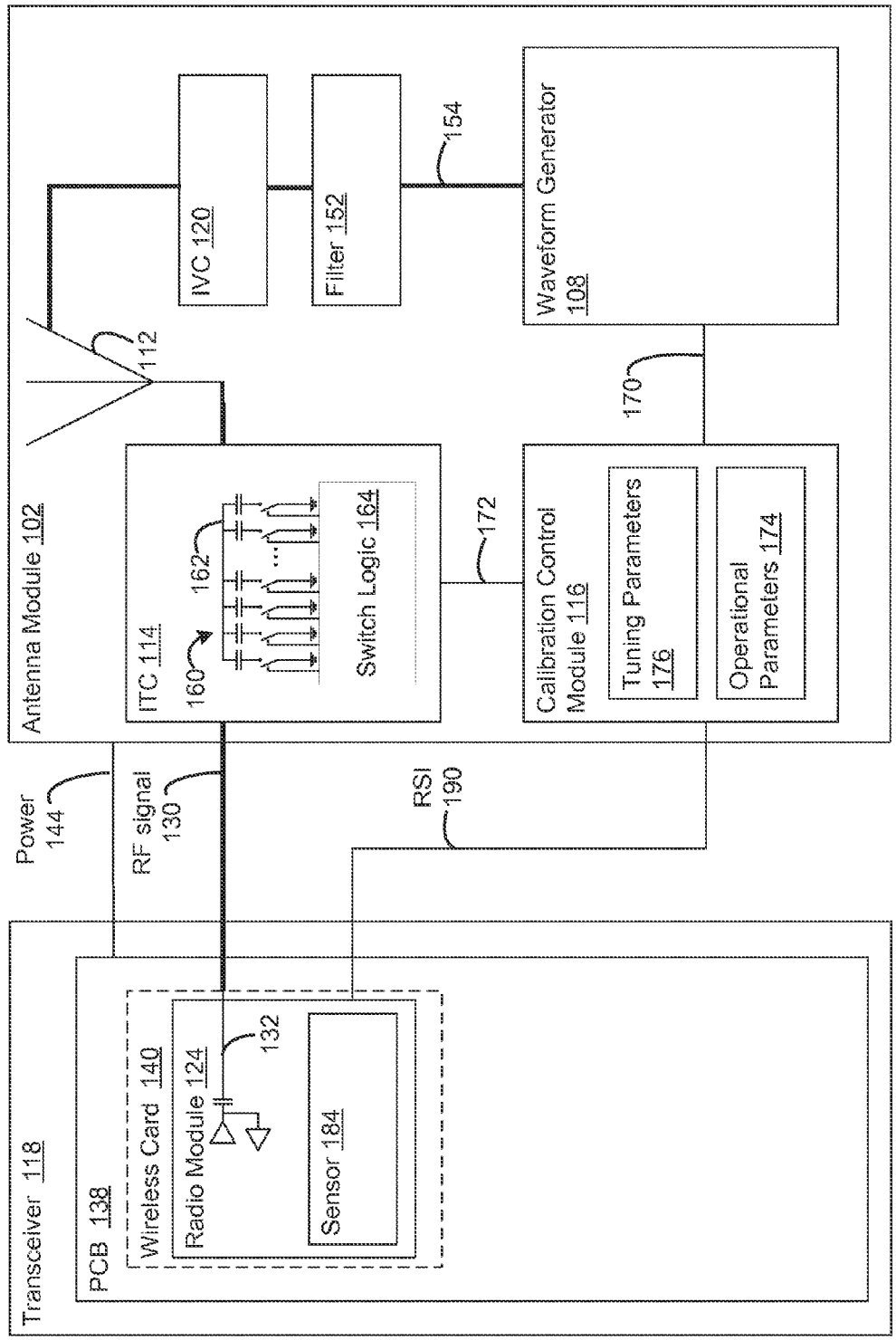
FIG. 1 illustrates a plug-and-play antenna module and a transceiver in accordance with some embodiments.

In the following detailed description, reference is made to the accompanying drawings that form a part hereof, wherein like numerals designate like parts throughout, and in which is shown by way of illustration, embodiments in which the subject matter of the present disclosure may be practiced.

Various operations are described as multiple discrete operations in turn, in a manner that is helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used herein, the term "module" may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality.

Original equipment manufacturers (OEMs) develop proprietary industrial designs for mobile devices of various form factors. To account for industrial design differences that negatively affect antenna performance, conventional antennas are specifically designed and integrated into particular mobile device models. However, it is challenging to affordably and timely design for every different device a specific, optimized antenna. Furthermore, manufacturing errors and unpredictable environmental factors can degrade the antenna performance, even for fully integrated antenna designs.

According to embodiments described below, a dynamically configurable plug-and-play antenna module is capable of changing a resonance response of the antenna (hereinafter "antenna response") for multiband, single band, and/or broadband operational modes. Additionally, the plug-and-play antenna module may be calibrated to match impedances for various mobile device form factors, to adjust for variances in antenna-installation locations attributable to manufacturing tolerances or errors, and to dynamically compensate for various environmental factors. Thus, without changing the antenna structure, the plug-and-play antenna module may accommodate a variety of form factors having a wide range of proprietary designs and manufacturing differences. Furthermore, once deployed and configured for multi-band and broadband operation, the plug-and-play antenna module dynamically enhances antenna performance in response to human body affects or other environmental influences. Therefore, embodiments for a plug-and-play antenna module provide multiple operating modes and self-calibration capability in wireless antenna systems for various mobile communication devices such as smartphones, tablets, notebooks, netbooks, or other mobile devices.

FIG. 1 illustrates a plug-and-play antenna module 102 in accordance with some embodiments. The plug-and-play antenna module 102 is a time-variant antenna module including a waveform generator 108, an antenna 112, an impedance-tuning component (ITC) 114, and a calibration control module 116. In certain embodiments, the antenna 112 includes a passive antenna structure designed under mobile device boundary conditions for one or more wireless communication frequencies. The waveform generator 108, ITC 114, and calibration control module 116 may be collectively implemented in silicon. As explained below, the calibration control module 116 is configured to control the antenna response for multiband, single band, and/or broadband operational modes by producing with the waveform generator 108 a voltage waveform (also referred to herein as a control waveform) that controls the capacitance of an impedance-varying component (IVC) 120. In addition, the calibration control module 116 is configured to improve antenna efficiency by tuning the impedance of the ITC 114 to match the impedance of the antenna 112 with a transceiver 118 at operating frequencies.

The transceiver 118 includes a radio module 124. The radio module 124 may be coupled with the ITC 114 by a signaling interface 130 (e.g., a coaxial cable) for transmission of a data-carrying signal, such as a radio-frequency (RF) signal. The radio module 124 includes a transmission line 132 to communicate (e.g., transmit/receive) the RF signal with the antenna module 102 by way of the signaling interface 130. In some embodiments, the radio module 124 is disposed on a circuit board, such as printed circuit board (PCB) 138. The radio module 124 may be directly coupled with the PCB 138 or coupled with the PCB 138 through another circuit board (e.g., wireless card 140). The antenna module 102 receives power from a power interface 144, which may be disposed separately from the PCB 138 in some embodiments.

The waveform generator 108 is configured to generate one of a plurality of control waveforms that it provides to a filter 152 via a control waveform interface 154. The filter 152 is coupled with the IVC 120 by an antenna signaling interface, which may be a coaxial cable, to facilitate transmission of the control waveform to the IVC 120. The control waveform is excited to the antenna 112 via the IVC 120, which may be a varactor, for example. The filter 152 passes the control waveform to the IVC 120 by the antenna signaling interface while inhibiting the RF signal from interfering with the waveform generator 108. Thus, the filter 152 provides at least some degree of isolation between the waveform generator 108 and the transceiver 118.

The voltages of the control waveform vary (i.e., modulate and/or control) the capacitance of the IVC 120 and produce controlled variations of the characteristic resonant frequencies of the antenna 112. A modulation frequency of the control waveform may be greater than twice the radio signal bandwidth to meet the Nyquist sampling theorem for transmitting/receiving data without data contamination. By varying the impedance of the IVC 120, the antenna response is configured (or dynamically reconfigured) to change a resonating frequency from a first band to a second band, from one band to multi-bands, and/or from a relatively narrow-band to a relatively wideband. For example, in some embodiments, a control waveform that is a square waveform results in a dual-band antenna response, a control waveform that is a tri-step waveform results in a tri-band antenna response, and a control waveform that is a sawtooth waveform results in a wideband antenna response. Thus, varying amplitude, frequency, and/or shape of the control waveform provides selectable antenna responses without any changes to the antenna structure. The capability of dynamically reconfiguring the antenna response allows for the antenna 112 to be smaller than a conventional antenna and/or allows for the use of fewer antennas altogether. In some embodiments, the antenna 112 may be smaller than a conventional antenna by thirty percent or more.

The ITC 114 includes a switchable impedance module 160 that is dynamically tunable to match impedances between the antenna module 102 and a corresponding transceiver, such as the transceiver 118. The ITC 114 may be designed to interface with the transceiver 118 at a standardized or predetermined impedance (e.g., fifty Ohms or another impedance value), and the switchable impedance module 160 is dynamically tunable to adjust for variations in the standardized or predetermined impedance value.

In addition to impedance matching capabilities, the switchable impedance module 160 may also provide impedance at the antenna signaling interface that affects the antenna response and can therefore tune the antenna frequencies to compensate for environmental changes attributable to human hands or other environmental conditions, to different installation locations for various different phone models and/or manufacturing deviations, or to other conditions that change the impedance of the transceiver 118.

As shown in FIG. 1, in certain embodiments, the switchable impedance module 160 includes an array of capacitors 162 (or other impedance tuning components) of different values that are addressable with switch logic 164. The switch logic 164 is configured to electrically activate or deactivate individual capacitors, and establish selected combinations of active/inactive capacitors depending on a desired impedance value. For example, the impedance of the antenna module may be configurable by switching individual capacitors in the array of capacitors 162 between the RF signaling interface 130 and ground. In some embodiments, and depending on the desired resolution and range of impenence values, five or six (for example) individual capacitor elements are included in the array 162. For example, a digitally tunable capacitor (DTC) that includes switchable capacitors is model number PE64904 DuNE™ DTC, available from Peregrine Semiconductor of San Diego, Calif., USA. Persons skilled in the art will recognize from the disclosure herein, however, that other DTC may be used, any number of capacitors may be used, and that various different capacitor values may be used to achieve a desired impedance tuning resolution.

The calibration control module 116 is coupled with the antenna module 102 and provides digital control signals to the waveform generator 108 via an operational control interface 170, and provides digital control signals to the ITC 114 via a calibration control interface 172, which may be a serial data interface.

The calibration control module 116 provides an input to the waveform generator 108 to configure the antenna 112 for a desired wireless transmission protocol. The calibration control module 116 controls the waveform generator 108 in a manner to apply control waveforms with appropriate amplitude, shape, and/or frequency to establish various operational modes. In some embodiments, the calibration control module 116 controls the waveform generator 108 based on operational parameters 174. The operational parameters 174, in some embodiments, are parameters that relate to an operational mode of the transceiver 118. For example, in some embodiments, the transceiver 118 switches from operating in a first operational mode in accordance with a first protocol—e.g., digital television (DTV), long-term evolution (LTE), WiFi, WiMAX, Bluetooth, global positioning satellite (GPS), near field communication (NFC), or another protocol—that uses a first antenna response, to operating in a second operational mode in accordance with a second protocol that uses a second antenna response. Additionally, in some embodiments, different operational modes may also be used within one protocol. For example, the transceiver 118 may use a first antenna response for uplink communications and a second antenna response for downlink communications. Other operational parameters may be additionally/alternatively used in other embodiments.

The calibration control module 116 also controls values input to the ITC 114 by receiving impedance values for the transceiver 118 and for the antenna 112, determines a desired calibration control value, and provides the desired calibration control value to the ITC 114. In some embodiments, the calibration control module 116 also concurrently controls the waveform generator 108 based on the tuning parameters 176.

The tuning parameters 176, in some embodiments, are parameters that relate to the operating environment of the transceiver 118, or its components. For example, in some embodiments, the position of a user's hand holding a mobile communication device hosting the transceiver 118 detunes the antenna response. In another example, an antenna response deviates from an expected antenna response to a less optimal antenna response upon installation and placement of the antenna module 102 in a mobile communication device. In either example, the calibration control module 116 controls the ITC 114 to tune the antenna response to compensate for environmental changes. In such a manner, the antenna response may be adapted to a particular environment in which the antenna 112 is operating.

In various embodiments, the calibration control module 116 may be pre-programmed with the tuning parameters 176 (e.g., at assembly of the mobile communication device) and/or may receive the tuning parameters 176 dynamically through operation. In one embodiment, the radio module 124 may include a sensor 184 to sense changes in electrical characteristics associated with the transmission line 132 and/or RF signal on the signaling interface 130. For example, the sensor 184 detects signal power of the RF signal, output impedance of the radio module 124, or other electrical characteristics. These sensed changes may indicate that an antenna response has become detuned. The sensor 184 may generate radio status information (RSI) based on these sensed electrical characteristics and feed the RSI back to the calibration control module 116 via an RSI interface 190. The calibration control module 116 then adjusts the antenna response based on the RSI. In other embodiments, a similar sensor may be located in or coupled to the antenna module 102 and/or outside the radio module 124 in the transceiver 118.

Figure 2:
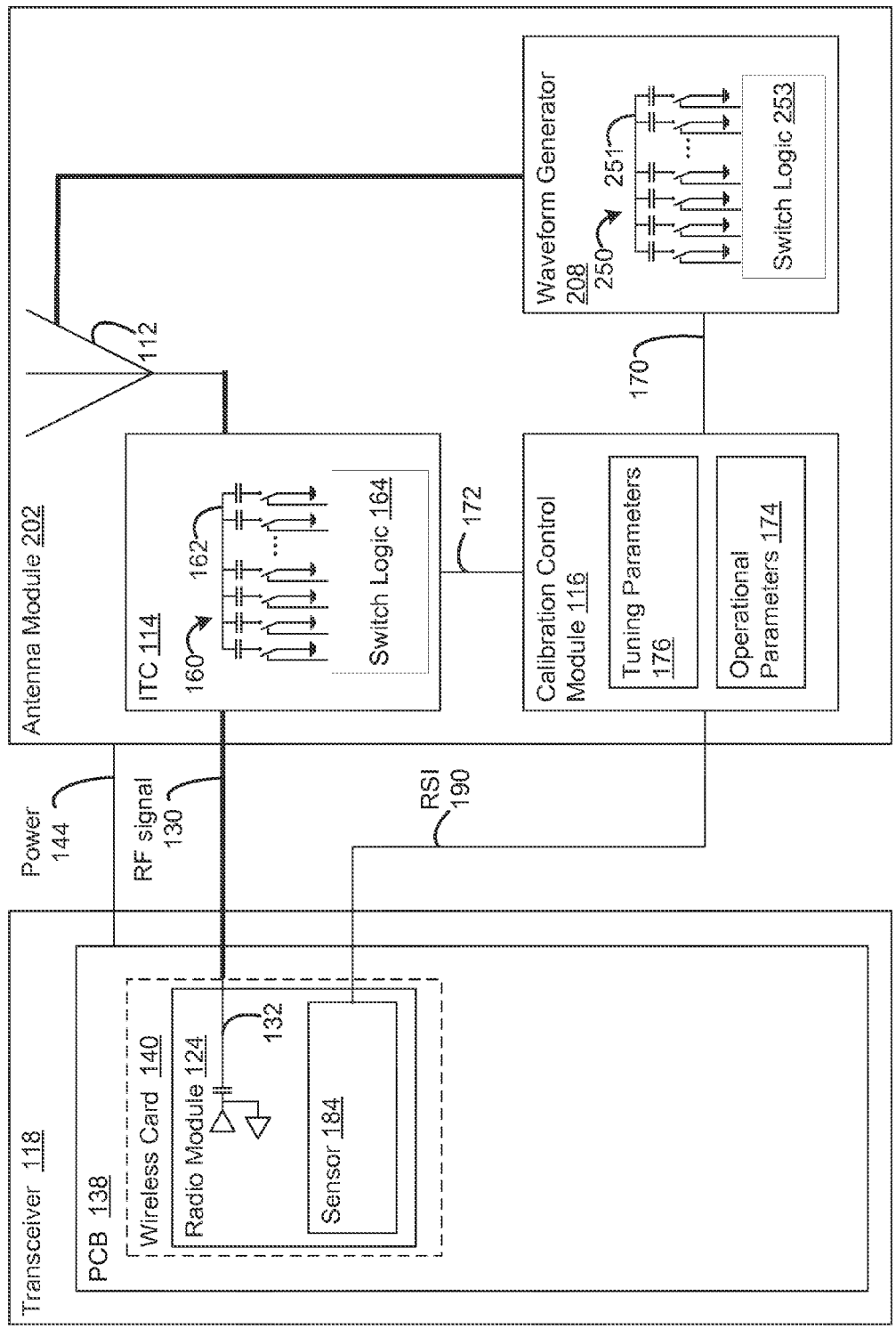
FIG. 2 illustrates a plug-and-play antenna module and a transceiver in accordance with some embodiments.

FIG. 2 illustrates a plug-and-play antenna module 202 in accordance with some embodiments. The antenna module 202 includes a waveform generator 208, an antenna 112, an ITC 114, and a calibration control module 116 that are similar to previously described components, except as noted below. Additionally, a transceiver 118 shown in FIG. 2 and its components operate similar to the transceiver 118 shown in FIG. 1 and its components, except as otherwise noted.

In this embodiment, rather than producing a voltage waveform, the waveform generator 208 includes a switchable impedance module 250 that is similar to the switchable impedance module 160. The switchable impedance module 250 includes an array of capacitors 251 and switch logic 253, which the waveform generator 208 uses to produce a plurality of different digitally controlled "capacitance waveforms" to modulate the impedance at an antenna signaling interface and control the antenna response, as described above. For example, the switchable impedance module 250 may switch back and forth between two capacitance values to generate a square capacitance waveform applied to an input of the antenna 112 that produces a dual-band antenna response. As other examples, the switchable impedance module 250 generates a tri-step capacitance waveform that produces a tri-band antenna response, and the switchable impedance module 250 generates a sawtooth capacitance waveform that produces a wideband antenna response. Skilled persons will recognize from the disclosure herein that other capacitance waveforms may be used to generate other antenna responses. Thus, varying amplitude, frequency, and/or shape of the capacitance waveform provides selectable antenna responses without any changes to the antenna structure. The capacitance values of the switchable impedance module 250 are selected to produce the capacitance waveforms with desired resolutions. In other embodiments, an ITC and waveform generator are combined and use a single switchable impedance module that functions in a similar manner as a standalone ITC, waveform generator, and/or IVC.

Figure 3:
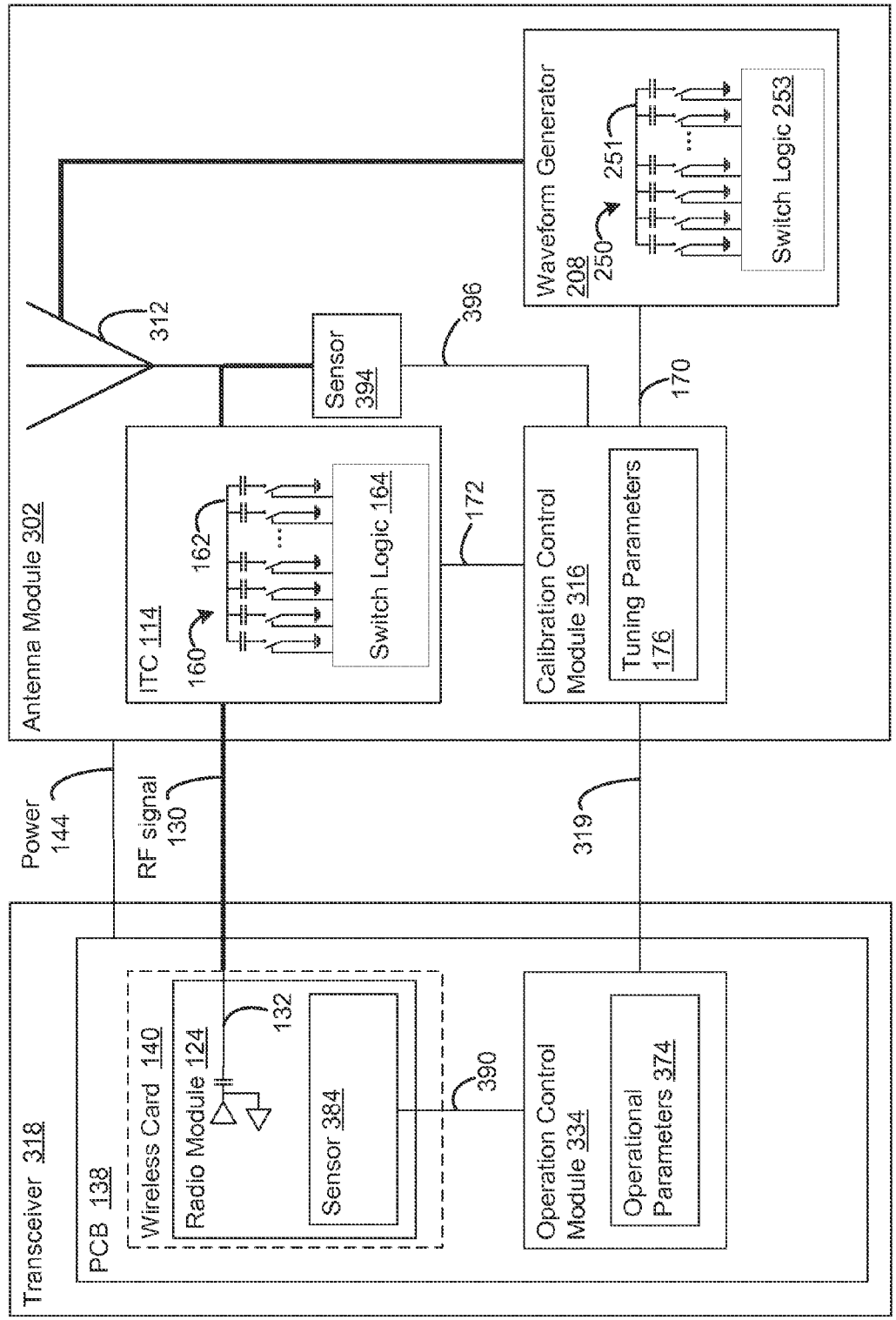
FIG. 3 illustrates a plug-and-play antenna module and a transceiver in accordance with some embodiments.

FIG. 3 illustrates a plug-and-play antenna module 302 according to another embodiment. The antenna module 302 includes a waveform generator 208, an antenna 112, and an ITC 114 that are similar to previously described components. However, in this embodiment, a calibration control component 316 communicates to a transceiver 318 via a calibration control interface 319. The transceiver 318 includes an operational control module 334 that has operational parameters 374 similar to operational parameters 174. The transceiver 318 receives RSI from sensor 384 via an RSI interface 390 that is internal to the transceiver 318, and establishes an operational mode based on the operational parameters 374. Operational mode information is conveyed to the calibration control module 316 by way of the control interface 319. The calibration control module 316 uses operational mode information alone, or in combination with other electrical characteristics received from, for example, an antenna sensor 394 via an antenna sensor interface 396, to control the waveform generator 208 and the ITC 114, as previously described.

Figure 4:
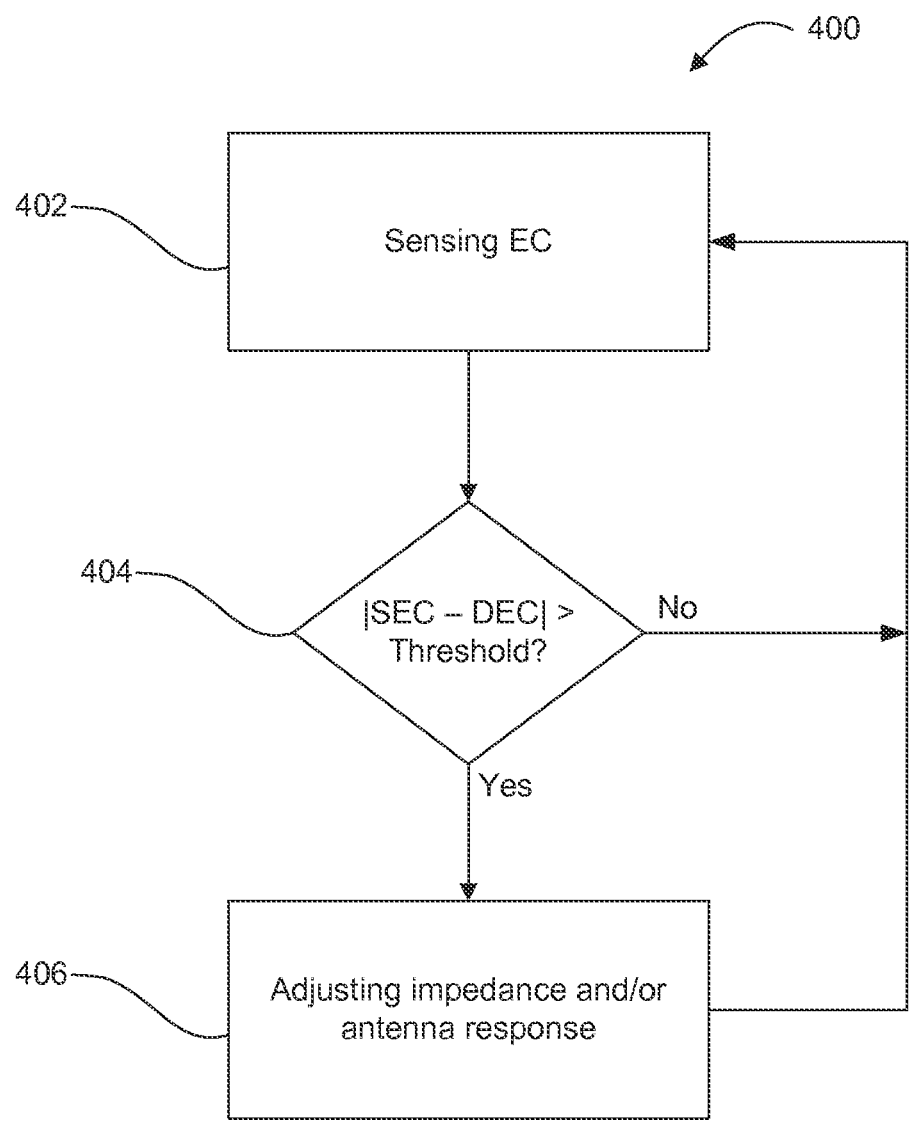
FIG. 4 is a flowchart depicting a calibration operation in accordance with some embodiments.

FIG. 4 is a flowchart depicting a tuning operation 400 in accordance with some embodiments. The tuning operation 400 includes sensing 402 (e.g., with sensor 184, 384, and/or 394) electrical characteristics (EC) of a signal, radio module, and/or transmission line. The EC may be sensed on a radio module's transmission line that is coupled with a signaling interface, and/or by characteristics of other signals within the radio module itself. In various embodiments, various electrical characteristics may be sensed including, but not limited to, signal power and output impedance.

The tuning operation 400 also includes comparing 404 sensed electrical characteristics (SEC) to predetermined desired electrical characteristics (DEC). The DEC may be a range of permissible or expected values of the particular electrical characteristics. The comparing 404 may include determining whether an absolute value of a difference between the SEC and the DEC is greater than a predetermined threshold value. The predetermined threshold value may correspond with the range of permissible or expected values.

If it is determined that the difference between the SEC and the DEC is greater than the predetermined threshold value, the tuning operation 400 includes adjusting 406 an impedance of a plug-and-play antenna module (e.g., antenna modules 102, 202, and 302) and/or adjusting a control waveform. The adjusting may occur by a calibration control module (e.g., calibration control module 116 or 316) providing appropriate digital control signals to an impedance tuning component (e.g., ITC 114) and to a waveform generator (e.g., waveform generator 108 or 208). The tuning operation 400 may then loop back to sensing 402 of the EC.

If, however, it is determined 404 that the difference between the SEC and the DEC is less than or equal to the predetermined threshold value, the tuning operation 400 may loop back to sensing 402 of the EC.

Calibration of the antenna module, according to certain embodiments, can be performed dynamically and at various times depending on actual or anticipated factors that affect the antenna response. For example, three calibration routines are contemplated as follows, presented in order of increasing calibration precision: a primary, secondary, and final calibration.

The primary calibration is a relatively coarse calibration performed prior to installation (or following shortly thereafter) of the antenna module. The primary calibration routine accounts for different transceiver impedance specifications, for mobile-device boundary conditions attributable to form factor differences, or for other proprietary industrial design differences.

The secondary calibration routine is employed upon completion of the OEM-assembly stage to automatically account for manufacturing errors or deviations among similar or identical mobile communication devices.

Once the mobile communication device is shipped to a user, the final calibration routine is employed to sense conditions such as the presence of a human hand, or other environmental changes, and then dynamically adjust the impedance with ITC based on the transceiver impedance, and optionally tune the antenna response depending on how the user is holding the phone, for example.

Figure 5:
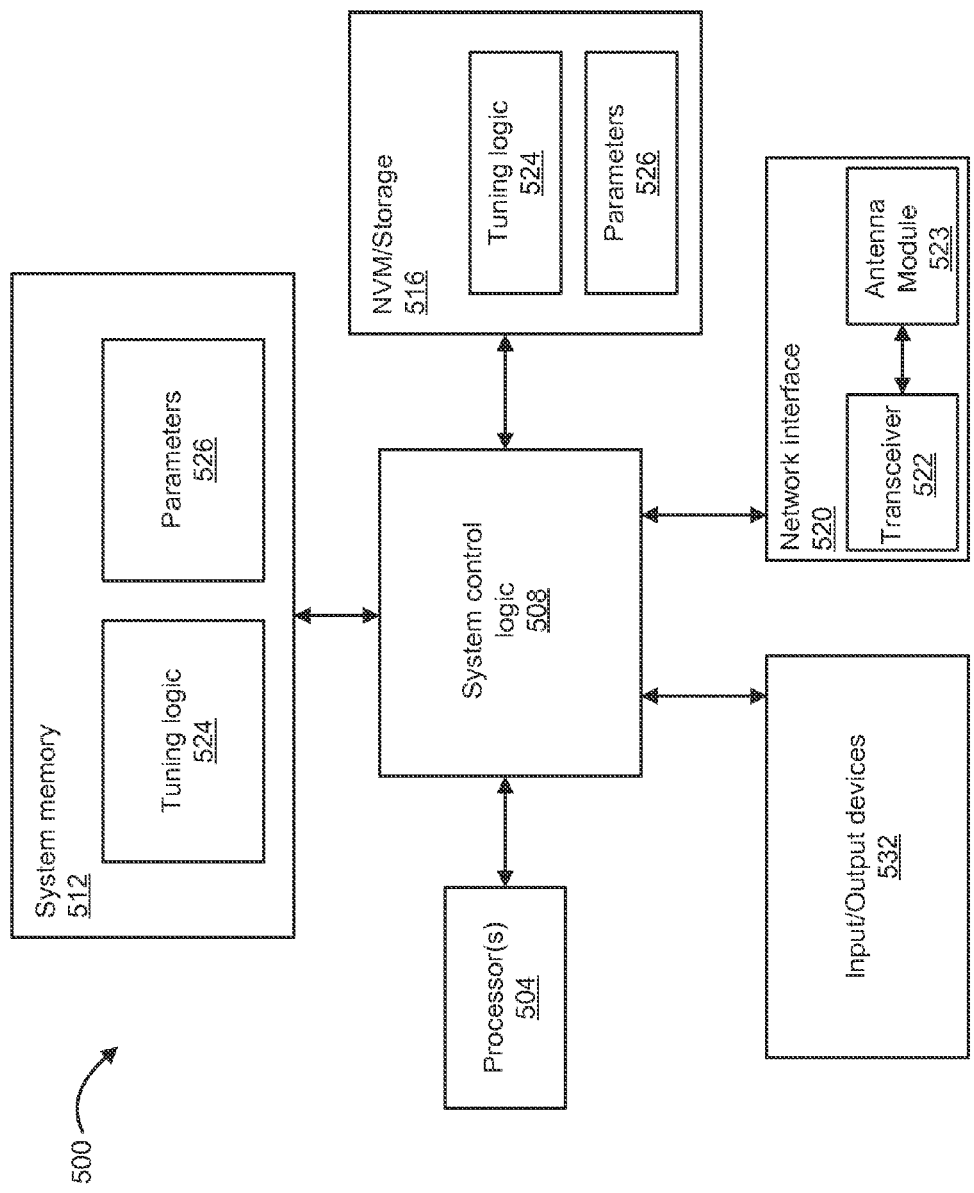
FIG. 5 illustrates a system that may be used to practice various embodiments described herein.

The plug-and-play antenna modules described herein may be implemented into a system using any suitable hardware and/or software to configure as desired. FIG. 5 illustrates, for one embodiment, an example system 500, such as a mobile phone or other mobile communication device, comprising one or more processor(s) 504, system control logic 508 coupled with at least one of the processor(s) 504, system memory 512 coupled with the system control logic 508, non-volatile memory (NVM)/storage 516 coupled with the system control logic 508, and a network interface 520 coupled with the system control logic 508.

The processor(s) 504 may include one or more single-core or multi-core processors. The processor(s) 504 may include any combination of general-purpose processors and dedicated processors (e.g., graphics processors, application processors, or other processors).

System control logic 508 for one embodiment may include any suitable interface controllers to provide for any suitable interface to at least one of the processor(s) 504 and/or to any suitable device or component in communication with the system control logic 508.

The system control logic 508 for one embodiment may include one or more memory controller(s) to provide an interface to the system memory 512. The system memory 512 may be used to load and store data and/or instructions, for example, for the system 500. The system memory 512 for one embodiment may include any suitable volatile memory, such as suitable dynamic random access memory (DRAM), for example.

The NVM/storage 516 may include one or more tangible, non-transitory computer-readable media used to store data and/or instructions, for example. The NVM/storage 516 may include any suitable non-volatile memory, such as flash memory, for example, and/or may include any suitable non-volatile storage device(s), such as one or more hard disk drive(s) (HDD(s)), one or more compact disk (CD) drive(s), and/or one or more digital versatile disk (DVD) drive(s) for example.

The NVM/storage 516 may include a storage resource physically part of a device on which the system 500 is installed or it may be accessible by, but not necessarily a part of, the device. For example, the NVM/storage 516 may be accessed over a network via the network interface 520.

The system memory 512 and the NVM/storage 516 may respectively include, in particular, temporal and persistent copies of tuning logic 524 and parameters 526, e.g., operational and tuning parameters. The tuning logic 524 may include instructions that, when executed by at least one of the processor(s) 504, result in the system 500 performing tuning operations described herein. In some embodiments, the tuning logic 524, or hardware, firmware, and/or software components thereof, may additionally/alternatively be located in the system control logic 508, the network interface 520, and/or the processor(s) 504.

The network interface 520 may have a transceiver 522 coupled to a plug-and-play antenna module 523 to provide a radio interface for the system 500 to communicate over one or more network(s) and/or with any other suitable device. The network interface 520 may include any suitable hardware and/or firmware. The network interface 520 may include a plurality of antenna modules to provide a MIMO radio interface. The network interface 520, for one embodiment, may include a network adapter, a wireless network adapter, a telephone modem, and/or a wireless modem.

The transceiver 522 may be similar to, and substantially interchangeable with, transceivers 118 and/or 318. Likewise, the antenna module 523 may be similar to, and substantially interchangeable with, antenna modules 102, 202, and/or 302. In various embodiments, the transceiver 522 or antenna module 523 may be integrated with other components of the system 500. For example, the transceiver 522 may include a processor of the processor(s) 504, memory of the system memory 512, and NVM/Storage of the NVM/Storage 516.

For one embodiment, at least one of the processor(s) 504 may be packaged together with logic for one or more controller(s) of the system control logic 508. For one embodiment, at least one of the processor(s) 504 may be packaged together with logic for one or more controllers of the system control logic 508 to form a System in Package (SiP). For one embodiment, at least one of the processor(s) 504 may be integrated on the same die with logic for one or more controller(s) of the system control logic 508. For one embodiment, at least one of the processor(s) 504 may be integrated on the same die with logic for one or more controller(s) of the system control logic 508 to form a System on Chip (SoC).

The system 500 may further include input/output (I/O) devices 532. The I/O devices 532 may include user interfaces designed to enable user interaction with the system 500, peripheral component interfaces designed to enable peripheral component interaction with the system 500, and/or sensors designed to determine environmental conditions and/or location information related to the system 500.

In various embodiments, the user interfaces could include, but are not limited to, a display (e.g., a liquid crystal display, a touch screen display, etc.), a speaker, a microphone, one or more cameras (e.g., a still camera and/or a video camera), a flashlight (e.g., a light emitting diode flash), and a keyboard.

In various embodiments, the peripheral component interfaces may include, but are not limited to, a non-volatile memory port, an audio jack, and a power supply interface.

In various embodiments, the sensors may include, but are not limited to, a gyro sensor, an accelerometer, a proximity sensor, an ambient light sensor, and a positioning unit. The positioning unit may also be part of, or interact with, the network interface 520 to communicate with components of a positioning network, e.g., a global positioning system (GPS) satellite.

In various embodiments, the system 500 may be a mobile computing device such as, but not limited to, a laptop computing device, a tablet computing device, a netbook, a smartphone, etc. In various embodiments, the system 500 may have more or less components, and/or different architectures.

It will be understood by skilled persons that many changes may be made to the details of the above-described embodiments without departing from the underlying principles of the invention. The scope of the present invention should, therefore, be determined only by the following claims.

The invention claimed is:

1. An antenna module configured to communicate a radio frequency (RF) signal with a transceiver, the antenna module comprising:
    an antenna;
    an impedance tuning component coupled to the antenna, the impedance tuning component to match an impedance of the antenna to the transceiver at a plurality of operating frequencies;
    a waveform generator coupled to the antenna, the waveform generator to generate a control waveform; and
    a calibration control module coupled with the transceiver and the waveform generator, the calibration control module to control the waveform generator to selectively provide the control waveform to vary a response of the antenna, and to selectively tune the impedance tuning component.

2. The antenna module of claim 1, wherein the waveform generator is configured to generate a voltage waveform.

3. The antenna module of claim 2, further comprising:
    an impedance varying component coupled between the waveform generator and the antenna, the impedance varying component responsive to the voltage waveform to produce controlled variations of characteristic resonant frequencies of the antenna.

4. The antenna module of claim 3, further comprising:
    a filter coupled in line with the impedance varying component between the waveform generator and the antenna.

5. The antenna module of claim 3, wherein the impedance varying component comprises a varactor.

6. The antenna module of claim 1, wherein the waveform generator is configured to generate a capacitance waveform.

7. The antenna module of claim 6, wherein the waveform generator comprises a switchable impedance module.

8. The antenna module of claim 1, wherein the waveform generator, the calibration control module, and the impedance tuning component are monolithically integrated in a common die.

9. The antenna module of claim 1, wherein the impedance tuning component comprises a switchable impedance module.

10. The antenna module of claim 1, further comprising:
    a sensor coupled with an RF transmission line and configured to provide antenna and/or radio status information to the calibration control module based on an RF signal on the RF transmission line.

11. The antenna module of claim 1, wherein the calibration control module is configured to control the waveform generator based on pre-programmed tuning parameters.

12. The antenna module of claim 1, wherein the calibration control module is configured to control the waveform generator based on operational parameters.

13. The antenna module of claim 1, wherein the antenna comprises a passive antenna structure designed under mobile device boundary conditions for one or more wireless communication frequencies.

14. A method for controlling a time-variant antenna module, comprising:
    generating a control waveform to vary a response of an antenna and thereby provide a selected operating frequency of the time-variant antenna module;
    sensing an electrical characteristic associated with the antenna and/or a radio;
    comparing the sensed electrical characteristic to predetermined desired electrical characteristics; and
    adjusting, based on said comparing, a switchable impedance value to match impedances between the antenna and the radio at the selected operating frequency of the time-variant antenna module.

15. The method of claim 14, wherein said comparing includes:
    determining that an absolute value of a difference between the sensed electrical characteristics and the desired electrical characteristics is greater than a predetermined value.

16. The method of claim 14, wherein the electrical characteristic is an input impedance of an antenna module and/or output impedance of a radio module.

17. The method of claim 14, wherein the predetermined desired electrical characteristics are associated with a mobile device form factor.

18. The method of claim 14, wherein the predetermined desired electrical characteristics are associated with manufacturing tolerances of a particular mobile device form factor.

19. The method of claim 14, wherein the sensed electrical characteristics correspond to environmental effects.

20. An antenna module, comprising:
    an antenna for transmitting and receiving radio frequency (RF) signals;
    means for tuning an impedance of the antenna in response to changing environmental conditions; and
    means for varying a response of the antenna to change between operational modes.

21. The antenna module of claim 20, wherein the operational modes are selected from a group comprising multi-band, single band, and broadband operational modes.

22. A mobile communication device, comprising:
a radio module; and
an antenna module coupled with the radio module by a signaling interface configured to convey a radio-frequency (RF) signal between the radio and antenna modules, the antenna module including:
an antenna;
an impedance tuning component coupled to the antenna and to the signaling interface;
a waveform generator; and
a calibration control module coupled with the waveform generator and with the impedance tuning component, the calibration control module configured to receive radio status information and, based on the radio status information, to control the waveform generator to vary a response of the antenna, and to tune the impedance tuning component to match impedances between the radio and antenna modules.

23. The mobile communication device of claim 22, further comprising:
an impedance varying component responsive to the voltage waveform, wherein the waveform generator is configured to generate a voltage waveform.

24. The mobile communication device of claim 22, wherein the waveform generator is configured to generate a capacitance waveform, and wherein the waveform generator comprises a switchable impedance module.

25. The mobile communication device of claim 22, wherein the radio module comprises:
a transmission line to communicate the RF signal with the signaling interface; and
a sensor proximal the signaling interface, the sensor configured to sense an electrical characteristic associated with the RF signal or the transmission line and to generate the radio status information based on the sensed electrical characteristic.

26. The mobile communication device of claim 25, wherein the sensed electrical characteristic corresponds to an input impedance of the antenna module and/or an output impedance of the radio during operation of the mobile communication device.

27. The mobile communication device of claim 22, wherein the signaling interface comprises a coaxial cable.

28. The mobile communication device of claim 22, wherein the calibration control module and the impedance tuning component are coupled via a serial interface.

29. The mobile communication device of claim 22, wherein the impedance tuning component includes a switchable impedance module.

* * * * *